(12) United States Patent  
Seki

(10) Patent No.: US 6,259,729 B1  
(45) Date of Patent: Jul. 10, 2001

(54) METHOD OF AND AN APPARATUS FOR TRAINING TAP COEFFICIENTS OF AN ADAPTIVE EQUALIZER

(75) Inventor: Katsutoshi Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/216,024

(22) Filed: Dec. 18, 1998

(30) Foreign Application Priority Data

Dec. 19, 1997 (JP) .................................................... 9-364382

(51) Int. Cl.$^7$ .................................................. H03H 7/30
(52) U.S. Cl. ............................................................ 375/231
(58) Field of Search .................................... 375/229, 231, 375/232, 222, 260, 219, 295, 316; 708/300, 322, 404; 333/18, 28 R

(56) References Cited

U.S. PATENT DOCUMENTS

| 5,285,474 | 2/1994 | Chow et al. | 375/222 |
| 5,461,640 | * 10/1995 | Gatherer | 375/231 |
| 5,521,908 | 5/1996 | Younce et al. | 379/410 |

FOREIGN PATENT DOCUMENTS

| 0 734 133 A1 | 9/1996 | (EP) . |
| 0 942 561 A2 | * 9/1999 | (EP) . |
| 0 959 596 A1 | * 11/1999 | (EP) . |

OTHER PUBLICATIONS

Jacky S. Chow et al., "Equalizer Training Algorithms for Multicarrier Modulation Systems," IEEE 1993, pp 761–765.*

* cited by examiner

*Primary Examiner*—Tesfaldet Bocure  
(74) *Attorney, Agent, or Firm*—Scully, Scott, Murphy & Presser

(57) ABSTRACT

For training tap coefficients of an adaptive equalizer of L taps to be used for equalizing an impulse response of a transmission channel (200) to be shorter than v taps, stably and speedily, a training circuit comprises: a transmitter (100) for transmitting a transmission signal (x(D)) produced by converting a frequency-domain transmission vector (X) encoded with a PRBS into a time-domain; a target-impulse-response update means (1300) for producing an updated target impulse response ($B_u$) making use of frequency-domain division method referring to windowed tap coefficients ($w_w(D)$), a reception signal (y(D)), and a training vector (X) encoded with a replica of the PRBS; a target-impulse-response windowing means (1400) for outputting a windowed target impulse response ($B_w$) together wit a normalization coefficient (S) by windowing and normalizing the updated target impulse response ($B_u$) within L taps in a time-domain; a tap-coefficient update means (2500) for updating the windowed tap coefficients ($w_w(D)$) making use of a frequency-domain LMS method referring to the normalization coefficient (S), the windowed target impulse response ($B_w$), the training vector (X') and the reception signal (y(D)); and a tap-coefficient windowing means (1600) for windowing the updated tap coefficients into v taps. By updating the windowed tap coefficients ($w_w(D)$) repeatedly until a certain convergence condition is attained, the windowed tap coefficients ($w_w(D)$) are outputted as the tap coefficients of the adaptive equalizer.

15 Claims, 8 Drawing Sheets

METHOD OF AND AN APPARATUS FOR TRAINING TAP COEFFICIENTS OF AN ADAPTIVE EQUALIZER

BACKGROUND OF THE INVENTION

The present invention relates to a method of and an apparatus for training tap coefficients of an adaptive equalizer, and particularly to the method of and the apparatus for optimizing tap coefficients of a FIR (Finite Impulse Response) filter used as an adaptive equalizer to equalize a multicarrier data signal that has been transmitted through a distorting channel.

In a multicarrier data transmission system, input digital data are grouped into blocks, called symbols, of a certain number of parallel bits. The parallel bits of a symbol are further divided into a plurality of bit sets, and each of the bit sets is used to modulate each one of the same number of carrier signals of different frequencies. A preferred method of modulation/demodulation is a modulation to use an IFFT (Inverse Fast Fourier Transformation) and a demodulation to use a FFT (Fast Fourier Transformation).

FIG. 12 is a block diagram illustrating a system configuration of the multicarrier data transmission system, having a transmitter 300 comprising an encoder 120, an IFFT circuit 130 and a D/A (Digital to Analog) converter 140, and a receiver 400 for receiving a multicarrier data signal transmitted from the transmitter 300 through a transmission channel 200, comprising an A/D (Analog to Digital) converter 410, a FFT circuit 430, a FEQ (Frequency-domain EQualization) circuit 440 and a decoder 450. As to an adaptive equalizer 420 and a training circuit 500, they will be described afterwards.

When a symbol consists of binary data of 512 bits for modulating 256 carrier signals, for example, the encoder 120 divides the binary data into 256 sets of 2 bits, and encodes each n-th (n=1 to 256) component of a 256- dimensional frequency-domain vector representing the 256 carrier signals by n-th of the 256 sets of 2 bits, as follows. When the logic of n-th 2-bit set is {0, 0}, {0, 1}, {1, 0} or {1, 1}, the n-th component of the frequency-domain vector is encoded as 1+j, 1−j, −1+j or −1−j, for example, j being an imaginary.

The frequency-domain vector thus encoded is transformed into a time-domain digital signal by the IFFT circuit 130 and converted by the D/A converter 140 into an analog signal to be transmitted through the transmission channel 200 as the multicarrier data signal.

The multicarrier data signal received by the receiver 400 is sampled and converted into a time-domain digital signal by the A/D converter 410 and further transformed into a frequency-domain vector by the FFT circuit 430. The FEQ circuit 440 performs frequency-domain equalization of the frequency-domain vector for compensating distortion of the frequency-domain vector due to attenuation and delay caused through the transmission channel 200, and the decoder 450 reproduces the symbol data by decoding each component of the frequency-domain vector.

However, when duration of the impulse response of the transmission channel 200 is not negligible compared to symbol length, inter-symbol interference, that is, interference of a symbol with a preceding or a following symbol, or inter-channel interference, that is, interference of a signal of a carrier frequency with signals of neighboring carrier frequencies due to transmission distortion becomes dominant and impossible to be compensated by the above frequency-domain equalization.

A method developed for dealing with this problem is to shorten duration of the impulse response by compensating and equalizing the time-domain digital signal samples by the A/D converter 410, by performing convolution of the time-domain digital signal through a FIR filter 420 provided between the A/D converter 410 and the FFT circuit 430, and the training circuit 500 for optimizing tap coefficients of the FIR filter 420 so as to correctly equalize the transmission characteristic of the transmission channel 200.

A usual method of optimizing the tap coefficients of the FIR filter 420 is to repeatedly generate and transmit a PRBS (Pseudo-Random Binary Sequence) from the transmitter 300, and to make each of the tap coefficients converge into an optimum value at the receiver 400 by comparing the signal received from the transmitter 300 with a corresponding signal obtained from the same PRBS generated at the receiver side. The FIR filter 420 which has variable tap coefficients to be optimized for equalizing duration of the impulse response is hereinafter called the adaptive equalizer, and a process of and a means for optimizing the tap coefficients are called the training and the training circuit.

The present invention pertains to the training method and the training circuit for stably and rapidly optimizing tap coefficients of the adaptive equalizer.

As a prior art of the training method, there is a technique disclosed in a U.S. Pat. No. 5,285,474.

FIG. 13 is a block diagram illustrating a training circuit according to the prior art. The training circuit of FIG. 13 consists of a transmitter 100 and a receiver 1000 and performs training of tap coefficients of an adaptive equalizer (not depicted in FIG. 13) provided in the receiver 1000 for equalizing signal distortion due to transmission characteristic of a transmission channel 200 connecting the transmitter 200 and the receiver 1000.

The transmitter 100 comprises a first PRBS generator 110 for generating a PRBS signal, a first encoder 120 for encoding the PRBS signal into a frequency-domain transmission signal vector X, an IFFT circuit 130 for transforming the frequency-domain transmission signal vector X into a time-domain transmission signal x(D). (Hereinafter, a frequency-domain vector is denoted by a capital letter and a time-domain signal obtained by processing the frequency-domain vector with IFFT is expressed as a function of discrete delay variable D denoted by a corresponding small letter.)

The time-domain transmission signal x(D) is converted into analog signal, transmitted through the transmission channel 200, received by the receiver 1000 and converted again into a time-domain reception signal y(D). (Ordinary elements such as D/A and A/D converters are omitted to depict in FIG. 13.)

Here, following equation stands;

$$y(D)=x(D)*h(D)+n(D)$$

wherein h(D) and n(D) represent the impulse response and the noise signal of the transmission channel 200, and the operator '*' denotes convolution operation.

The above equation is expressed as Y=XH+N in the frequency domain.

The receiver 1000 comprises a second PRBS generator 1200 for generating a replica of the PRBS signal generated by the first PRBS generator 110, a second encoder 1250 for generating a frequency-domain training vector X' by encoding a frequency domain vector with the replica of the PRBS signal in the same way and in synchronization with the first encoder 120, a target-impulse-response update means 1300, a target-impulse-response windowing means 1400, a tap-coefficient update means 1500 and a tap-coefficient windowing means 1600.

The target-impulse-response update means 1300, the target-impulse-response windowing means 1400, and tap-coefficient update means 1500 and the tap-coefficient windowing means 1600 operate so as to make tap coefficients of the adaptive equalizer having L taps (L being a fixed integer) converge into optimum values which enable the adaptive equalizer to equalize and shorten the duration of the impulse response H, or h(D), of the transmission channel within v taps (v being another fixed integer), that is, within target duration of the equalized impulse response, by updating transitional values of the target impulse response and the tap coefficients alternately and repeatedly, referring to the reception signal y(D) and the training vector X'.

In the following paragraphs, outlines of operation of the target-impulse-response update means 1300, the target-impulse-response windowing means 1400, the tap-coefficient update means 1500 and the tap-coefficient windowing means 1600 will be described in the order.

The target-impulse-response update means 1300 outputs an updated target impulse response $B_u$ by updating a windowed target impulse response $B_w$ outputted from the target-impulse-response windowing means 1400 (as will be described afterwards), making use of the reception signal y(D), the training vector X' and windowed tap coefficients $w_w(D)$ outputted from the tap-coefficient windowing means 1600 (as will be described also afterwards), so that the updated target impulse response $B_u$ better approximates the frequency-domain vector HW of the equalized impulse response h(D) * $w_w(D)$ of the transmission channel 200. (Hereinafter, the subscript "u" refers to an updated quantity and the subscript "w" refers to a windowed quantity.)

In other words, the target-impulse-response update means 1300 asymptotically and recursively revises the windowed target impulse response $B_w$ towards a target, that is, a frequency-domain vector of an impulse response whereof duration can be equalized within v taps by the adaptive equalizer.

First, initial values of the windowed target impulse response $B_w$ and the tap coefficients $w_w(D)$ are set reasonably, then a loop of steps is repeated until a predetermined convergence condition is reached.

The windowed target impulse response $B_w$ is updated making use of either a frequency-domain LMS (Last Mean Square) method or a frequency-domain division method.

When the frequency-domain LMS method is employed, an error value E is calculated according to following equation (1) as a difference between the windowed target impulse response $B_w$ multiplied by the training vector X', which corresponds to a target reception signal, and the frequency-domain reception signal vector Y multiplied by a frequency-domain vector $W_w$ of the windowed tap coefficients $w_w(D)$, which corresponds to the equalized reception signal.

$$E = B_w X' - W_w Y \quad (1)$$

Then, the updated target impulse response $B_u$ is obtained according to following equation (2) from the error value E.

$$B_u = B_w + 2\mu E X^* \quad (2)$$

where $\mu$ is the LMS stepsize and $X^*$ denotes the complex conjugate of the training vector X'.

When the frequency-domain division method is employed, the updated target impulse response $B_u$ is calculated from above equation (1) as the windowed impulse response $B_w$ which gives the error value E=0, as follows;

$$B_u = W_w Y / X' \quad (3)$$

The target-impulse-response windowing means 1400 windows the updated target impulse response $B_u$ into the windowed target impulse response $B_w$ having v taps in the time-domain, as follows.

The updated target impulse response $B_u$ is transformed into a time-domain signal $b_u(D)$ through the IFFT, whereof consecutive v taps (or samples), which give a maximum total power, are selected, zeroing other taps. The selected consecutive v taps are then normalized to have a fixed power for preventing the training from converging into the all-zero, that is, $B_w = w_w(D) = 0$. The normalized time-domain signal $b_w(D)$ of v taps is transformed again into a frequency-domain vector through the FFT and outputted as the windowed target impulse response $B_w$, to be updated at the next step by the target-impulse-response update means 1300.

The tap-coefficient update means 1500 updates the windowed tap coefficients $w_w(D)$, in a similar way with the target-impulse-response update means 1300, that is, produces an updated tap-coefficient vector $W_u$ by updating the windowed tap coefficients $w_w(D)$ outputted from the tap-coefficient windowing means 1600 after windowed into L taps, referring to the windowed target impulse response $B_w$ outputted from the target-impulse-response windowing means 1400, the time-domain reception signal y(D) and the training vector X', so as to reduce the error value E given by above equation (1), making use of the frequency-domain LMS method or the frequency-domain division method.

The updated tap-coefficient vector $W_u$ is calculated according to following equation (4) when the frequency-domain LMS method is applied, or according to equation (5) when the frequency-domain division method is applied.

$$W_u = W_w + 2\mu E Y^* \quad (4)$$

$$W_u = B_w Y / X' \quad (5)$$

where $\mu$ is the LMS stepsize, $W_w$ is the frequency-domain vector of the windowed tap coefficients $w_w(D)$, and $X^*$ denotes the complex conjugate of the training vector X'.

The tap-coefficient windowing means 1600 windows the updated tap-coefficient vector $W_u$ with a time-window of L taps in a similar way with the target-impulse-response windowing means 1400, as follows.

The updated tap-coefficient vector $W_u$ is expanded in the time-domain as the updated tap coefficients $w_u(D)$ through the IFFT, whereof consecutive L taps (coefficients) which give a maximum total power are selected, zeroing other taps. The selected consecutive L tap coefficients are outputted as a first to an L-th component of the windowed tap coefficients $w_w(D)$, which are to be referred to by the target-impulse-response update means 1300 and to be updated by the tap-coefficient update means 1500 at the next step of the convergence loop.

In the prior art of FIG. 13, by generating The PRBS signal repeatedly in synchronization with each other at the transmitter 100 and the receiver 1000, the training steps at the target-impulse-response update means 1300, the target-impulse-response windowing means 1400, the tap-coefficient update means 1500 and the tap-coefficient windowing means 1600 are repeated until a predetermined convergence condition is reached, that is, until the error value E of equation (1) becomes within a threshold value, for example, and by applying convergence values of the windowed tap coefficients $w_w(D)$ thus obtained to the tap coefficients of the adaptive equalizer, the inter-symbol interference and the inter-channel interference are eliminated from the reception signal transmitted through the severe transmission cannel, impulse response duration of the transmission channel being equalized and sufficiently shortened by the adaptive equalizer.

In the above prior art, either or both of the windowed target impulse response $B_w$ and the windowed tap coefficients $w_w(D)$ may be updated either one of the frequency-domain LMS method and the frequency-domain division method. Therefore, following four applications can be considered:

1. To update both the windowed target impulse response $B_w$ and the windowed tap coefficients $w_w(D)$ making use of the frequency-domain LMS method;
2. To update the windowed target impulse response $B_w$ making use of the frequency-domain LMS method, and the windowed tap coefficients $w_w(D)$ making use of the frequency-domain division method;
3. To update the windowed target impulse response $b_w$ making use of the frequency-domain division method, and the windowed tap coefficients $w_w(D)$ making use of the frequency-domain LMS method; and
4. To update both the windowed target impulse response $B_w$ and the windowed tap coefficients $w_w(D)$ making use of the frequency-domain division method.

However, the first and the fourth application wherein both the windowed target impulse response $B_w$ and the windowed tap coefficients $w_w(D)$ are updated with the same method do not always give stable convergence. Therefore, when the tap number L of the adaptive equalizer is larger than the duration v of the target impulse response, the second application is usually employed, and the third application is employed usually when the tap number L is smaller than the target duration v.

When the third application is employed, that is, when the windowed tap coefficients $w_w(D)$ is updated by the frequency-domain LMS method, however, following problems have been observed.

First, it takes certainly long time for the windowed target impulse response $B_w$ or the windowed tap coefficients $w_w(D)$ to converge. This is because the normalization, which is performed in the target-impulse-response windowing means 1400 for preventing the training from converging into $B_w = w_w(D) = 0$, of the selected consecutive v taps of the time-domain target impulse response $b_u(D)$ affects the first term $B_w$ X' of the right side of equation (1) for giving the error value E to be used in equation (4) to calculate the updated tap coefficient vector $W_u$, and makes the error value E at the tap-coefficient update means 1500 not equivalent to the error value E at the target-impulse-response update means 1300.

Second, the windowed target impulse response $B_w$ or the windowed tap coefficients $w_w(D)$ may rather diffuse than converge because of the same reason, when the noise signal n(D) of the transmission channel is comparatively large.

SUMMARY OF THE INVENTION

Therefore, a primary object of the present invention is to provide a method of and apparatus for training tap coefficients of an adaptive equalizer stably in a short time by resolving above problems.

In order to achieve the object, in an embodiment according to the invention, a normalization coefficient S is outputted when normalization is performed for obtaining the windowed target impulse response $B_w$, and referring to the normalization coefficient S, the revision of the windowed rap coefficients $w_w(D)$ is performed making use of the frequency-domain LMS method according to following equations;

$$W_u = SW_w + 2 \mu E'Y^*$$

$$E' = B_w X' - SW_w Y$$

More concretely, in the method according to the embodiment of training tap coefficients of an adaptive equalizer having a first number of taps, for equalizing duration of an impulse response of a transmission channel to be shorter than a second number of taps with a sufficiently small error, having a step of initializing windowed tap coefficients to some predetermined values, a step of repeating a training procedure until a certain convergence condition of the windowed tap coefficients is attained, and a step of outputting the windowed tap coefficients as the tap coefficients of the adaptive equalizer after the certain convergence condition is attained; the training procedure comprises:

a transmission step of transmitting a transmission signal x(D) which is produced by transforming a frequency-domain transmission vector X encoded with a PRBS (Pseudo-Random Binary Sequence) into a time-domain;

a target-impulse response update step of producing an updated target impulse response $B_u$ by dividing an equalized reception signal vector Z with a training vector X', the equalized reception signal vector Z being produced by transforming an equalized reception signal z(D), which is obtained by processing the transmission signal y(D) received through the transmission channel with an equalizer having the first number of taps whereof coefficients are set to have values of the windowed tap coefficients $w_w(D)$, into a frequency-domain, and the training vector X being produced by encoding a frequency-domain vector with a replica of the PRBS;

a target-impulse-response windowing step of outputting a windowed target impulse response $B_w$ together with a normalization coefficient S, the windowed target impulse response $B_w$ being produced by transforming the updated target impulse response $B_u$ into a time-domain updated target impulse response signal $b_u(D)$, selecting the second number of consecutive tap values giving a maximum total power from tap values of the time-domain updated target impulse response $b_u(D)$, normalizing the selected consecutive tap values and transforming the normalized consecutive tap values into the frequency-domain, and the normalization coefficient S being obtained by dividing the normalized consecutive tap values with the selected consecutive tap values before normalization;

a tap-coefficient update step of producing an updated tap coefficient vector $W_u$ by updating a frequency-domain tap coefficient vector $W_w$ multiplied by the normalization coefficient S making use of a frequency-domain LMS (Least Mean Square) method with an error value E' defined as a difference of a product of the training vector X' and the windowed target impulse response $B_w$ to a product of the normalization coefficient S, the frequency-domain tap coefficient vector $W_w$ and a reception signal vector Y, the frequency-domain tap coefficient vector $W_w$ being obtained by transforming the windowed tap coefficients $w_w(D)$ into the frequency-domain, and the reception signal vector Y being obtained by transforming the transmission signal y(D) received through the transmission channel into the frequency-domain; and a tap-coefficient windowing step of producing the windowed tap coefficients $w_w(D)$ by transforming the updated tap coefficient vector $W_u$ into updated tap coefficients $w_u(D)$, selecting the first number of consecutive coefficients giving a maximum total power from coefficients of the updated tap coefficients $w_u(D)$ and shifting the selected consecutive coefficients to be assigned from a top of the windowed tap coefficients $w_w(D)$.

Therefore, the windowed tap coefficients $w_w(D)$ can be updated more effectively according to the embodiment than the prior art of FIG. 13, by thus reflecting the normalization coefficient S obtained at the target-impulse-response windowing step along with the windowing process of the time-domain updated target impulse response signal $b_u(D)$, on the frequency-domain LMS operation for producing the updated tap coefficient vector $W_u$, enabling to shorten the convergence time and to improve robustness of the training operation against noises.

In another embodiment of the invention, the normalization is performed when windowing of the updated tap coefficients $w_u(D)$ is performed, and the revision of the windowed target impulse response $B_w$ is performed referring to the windowed tap coefficients $w_w(D)$ after the normalization.

For the purpose, the target-impulse-response windowing step, the tap-coefficient update step and the tap-coefficient windowing step of the above embodiment are replaced with following respective steps, that is:

a target-impulse-response windowing step of producing the windowed target impulse response $B_w$ by transforming the updated target impulse response $B_u$ into the time-domain updated target impulse response signal $b_u(D)$, selecting the second number of consecutive tap values giving a maximum total power from tap values of the time-domain updated target impulse response $b_u(D)$ and transforming the selected consecutive tap values into the frequency-domain;

a tap-coefficient update step of producing the updated tap coefficient vector $W_u$ by updating the frequency-domain tap coefficient vector $W_w$ making use of the frequency-domain LMS method with an error value E defined as a difference of a product of the training vector X' and the windowed target impulse response $B_w$ to a product of the frequency-domain tap coefficient vector $W_w$ and the reception signal vector Y; and a tap-coefficient windowing step of producing the windowed tap coefficients $w_w(D)$ by transforming the updated tap coefficient vector $W_u$ into updated tap coefficients $w_u(D)$, selecting the first number of consecutive coefficients giving a maximum total power from coefficients of the updated tap coefficients $w_u(D)$, normalizing the selected consecutive coefficients and shifting the normalized consecutive coefficients to be assigned from a top of the windowed tap coefficients $w_w(D)$.

Therefore, effective revision of the windowed tap coefficients $w_w(D)$ considering the normalization can be realized also in this embodiment in the same way with the previous embodiment, enabling to shorten the convergence time and to improve robustness of the training operation against noises, without expressly retaining conformity of the normalization by way of the normalization coefficient S as required in the previous embodiment.

When the windowed target impulse response $B_w$ is to be updated making use of the frequency-domain LMS method and the windowed tap coefficients $w_w(D)$ are to be updated making use of the frequency-domain division method, the target-impulse-response update step, the tap-coefficient update step and the tap-coefficient windowing step may be replaced with following respective steps, that is:

a target-impulse-response update step of producing the updated target impulse response $B_u$ by updating the windowed target impulse response $B_w$ multiplied by a normalization coefficient S making use of the frequency-domain LMS method with an error value defined as a difference of a product of the normalization coefficient S, the training vector X' and the windowed target impulse response $B_w$ to a product of the frequency-domain tap coefficient vector $W_w$ and the reception signal vector Y;

a tap-coefficient update step of producing an updated tap coefficient vector $W_u$ by dividing a product of the windowed target response $B_w$ and the reception signal vector Y with the training vector X'; and a tap-coefficient windowing step of outputting the windowed tap coefficients $w_w(D)$ together with the normalization coefficient S, the windowed tap coefficients $w_w(D)$ being produced by transforming the updated tap coefficient vector $W_u$ into updated tap coefficients $w_u(D)$, selecting the first number of consecutive coefficients giving a maximum total power from coefficients of the updated tap coefficients $w_u(D)$, normalizing the selected consecutive coefficients and shifting the normalized consecutive coefficients to be assigned from a top of the windowed tap coefficients $w_w(D)$, and the normalization coefficient S being obtained by dividing the normalized consecutive coefficients with the selected consecutive coefficients before normalization.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
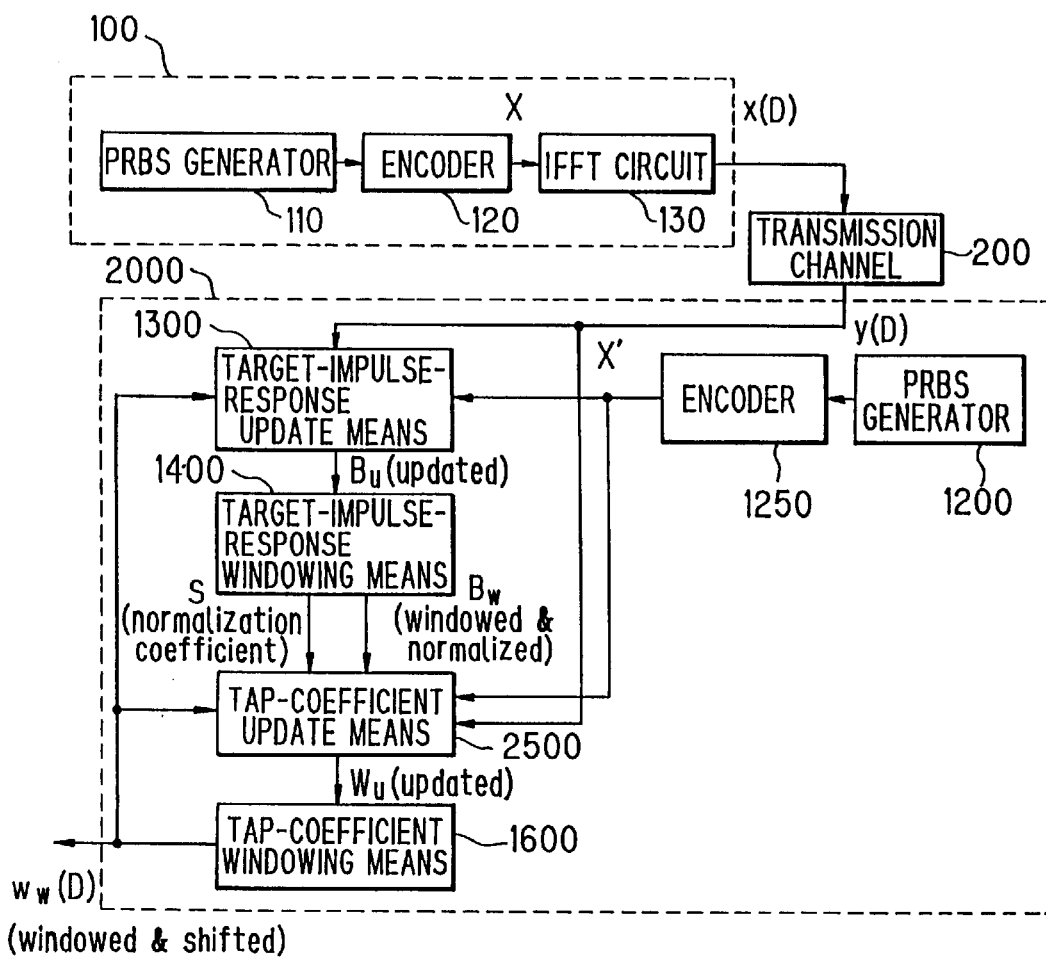
FIG. 1 is a block diagram illustrating a training circuit according to an embodiment of the invention.

FIG. 1 is a block diagram illustrating a training circuit according to an embodiment of the invention, comprising a transmitter 100 and a receiver 2000 for training tap coefficients of an adaptive equalizer (not depicted in the drawings) provided in the receiver 2000 in accordance with transmission characteristics of a transmission channel 200 connecting the transmitter 100 and the receiver 2000.

Figure 13:
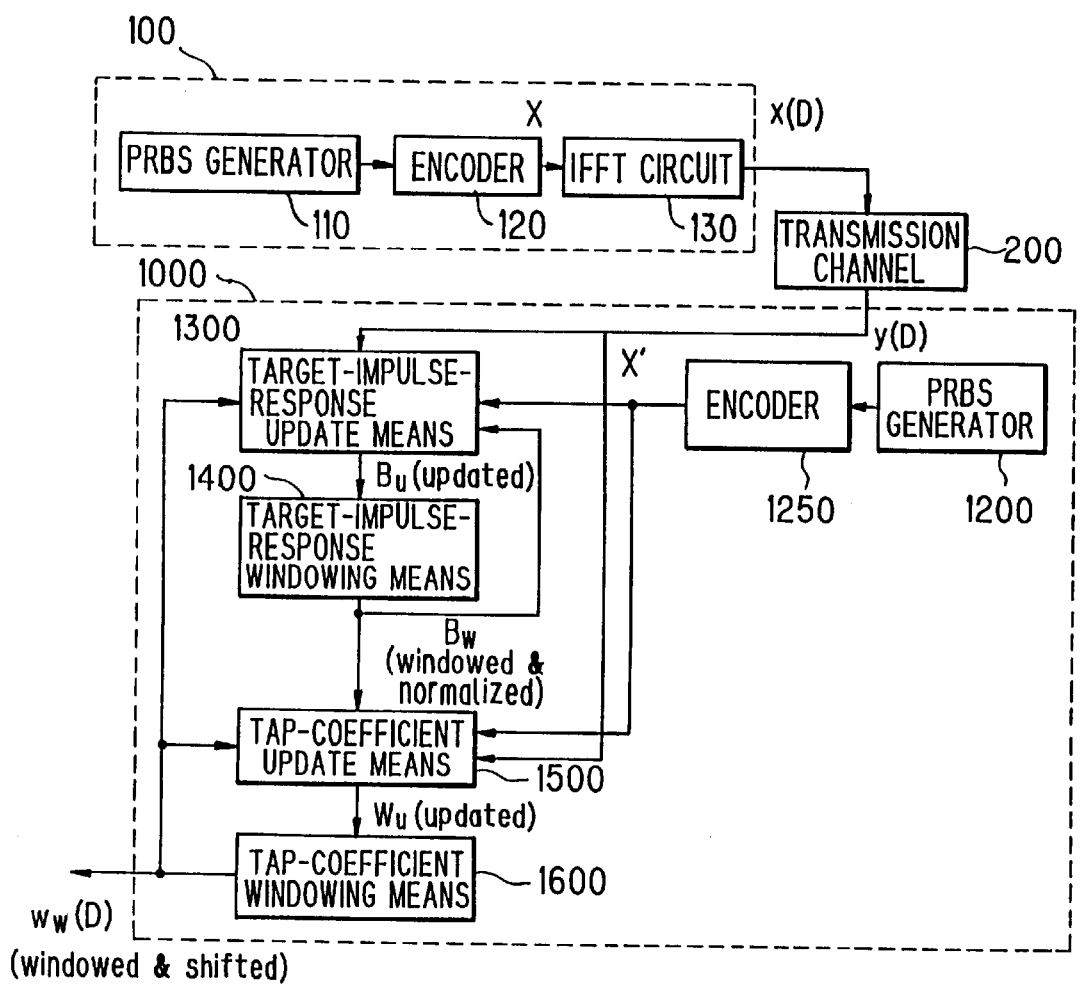
FIG. 13 is a block diagram illustrating a training circuit according to a prior art.

The transmitter 100 comprises, in the same way with the transmitter 100 of FIG. 13, a first PRBS generator 110 for generating a PRBS signal, a first encoder 120 for encoding the PRBS signal into a frequency-domain transmission signal vector X, an IFFT circuit 130 for transforming the frequency-domain transmission signal vector X into a time-domain transmission signal x(D).

The time-domain transmission signal x(D) is converted into analog signal, transmitted through the transmission channel 200, received by the receiver 2000 and sampled and converted again into a time-domain reception signal y(D) (Ordinary elements such as D/A and A/D converters are omitted to depict also in FIG. 1.)

Similarly to the receiver 1000 of FIG. 13, the receiver 2000 comprises a second PRBS generator 1200 for generating a replica of the PRBS signal generated by the first PRBS generator 110, a second encoder 1250 for generating a frequency-domain training vector X' by encoding the replica of the PRBS signal in the same way and in synchronization with the first encoder 120, a target-impulse-response update means 1300, a target-impulse-response windowing means 1400, a tap-coefficient update means 2500 and a tap-coefficient windowing means 1600.

A difference from the receiver 1000 of FIG. 13 is that the tap-coefficient update means 2500 is provided in place of the tap-coefficient update means 1500 which updates the windowed tap coefficients $w_w(D)$ referring to the windowed target impulse response $B_w$ outputted from the target-impulse-response windowing means 1400, the time-domain reception signal y(D) and the training vector X'.

The tap coefficient update means 2500 of FIG. 1 updated the windowed tap coefficients $w_w(D)$ further referring to a normalization coefficient S employed in the normalization of the time-domain target impulse response $b_w(D)$ performed in the target-impulse-response windowing means 1400, in addition to the windowed target impulse response $B_w$, the time-domain reception signal y(D) ad the training vector X'.

The target-impulse-response update means 1300, the target-impulse-response windowing means 1400, the tap-coefficient update means 2500 and the tap-coefficient windowing means 1600 operate, in the same way with the prior art apparatus of FIG. 13, so as to make tap coefficients of the adaptive equalizer having L taps (L being a fixed integer) converge into optimum values which enable the adaptive equalizer to equalize and shorten the duration of the impulse response H, or h(D), of the transmission channel within v taps (v being another fixed integer), that is, within target duration of the equalized impulse response, by updating transitional values of the target impulse response and the tap coefficients alternately and repeatedly, referring to the time-domain reception signal y(D) and the training vector X'.

In the following paragraphs, detailed configuration and operation of the target-impulse-response update means 1300, the target-impulse-response windowing means 1400, the tap-coefficient update means 2500 and the tap-coefficient windowing means 1600 will be described in the order.

Figure 2:
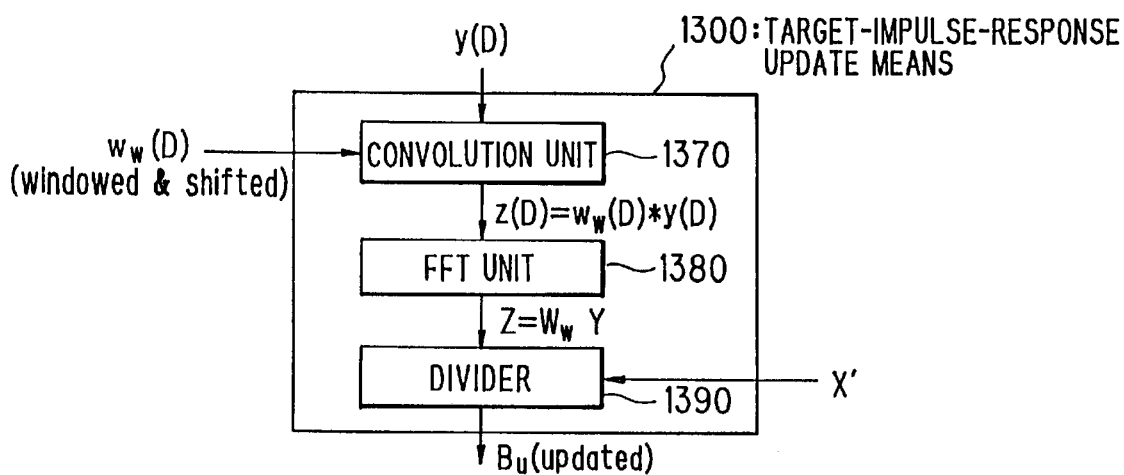
FIG. 2 is a block diagram illustrating an internal configuration of the target-impulse-response update means 1300 of FIG. 1.

FIG. 2 is a block diagram illustrating an internal configuration of the target-impulse-response update means 1300 of FIG. 1.

Referring to FIG. 2, the target-impulse-response update means 1300 comprises a convolution unit 1370, an FFT unit 1380, and a divider 1390, and updates the windowed target impulse response $B_w$ making use of the frequency-domain division method.

The convolution unit 1370 consists of a FIR filter having L taps, which may be the adaptive equalizer itself, and tap coefficients thereof are set with values of the windowed tap coefficients $w_w(D)$ outputted from the tap-coefficient windowing means 1600, or with reasonable values at the beginning of the training. The convolution unit 1370 performs convolution operation onto the time-domain reception signal y(D) and outputs an equalized reception signal $z(D)=w_w(D)*y(D)$.

The FFT unit 1380 performs discrete Fourier transformation onto the equalized reception signal z(D) for producing a frequency-domain equalized reception signal vector $Z=W_w Y$.

The divider 1390 outputs the updated target impulse response $B_u$ by dividing each component of the frequency-domain equalized reception signal vector Z by a corresponding component of the training vector X'.

Thus, the target-impulse-response update means 1300 produces the updated target impulse response calculated as follows;

$$B_u = W_w Y / X', \qquad (3)$$

making use of the frequency-domain division method.

Figure 3:
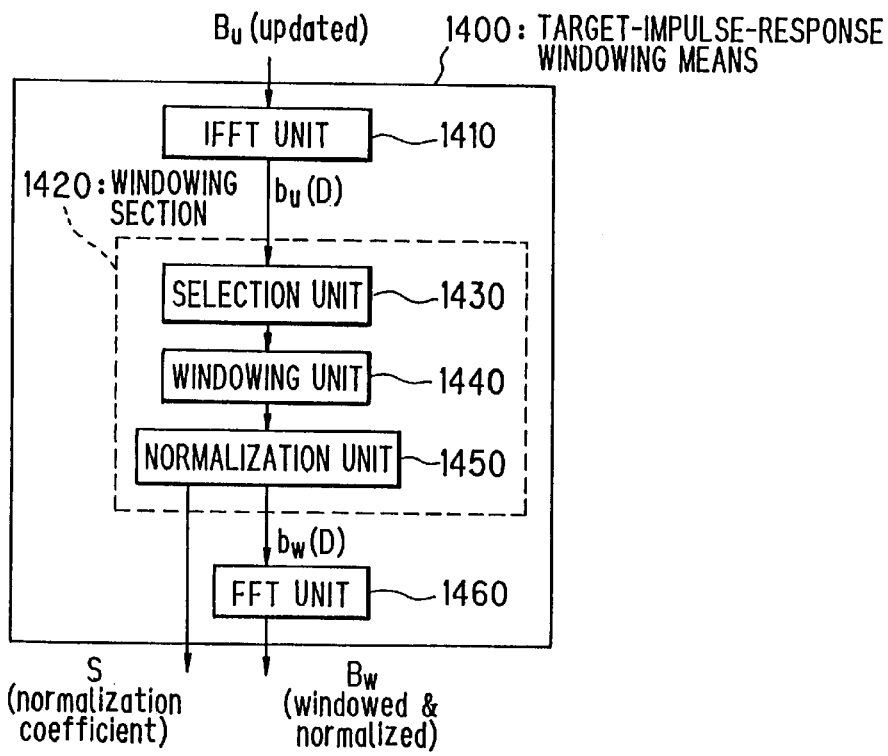
FIG. 3 is a block diagram illustrating an internal configuration of the target-impulse-response windowing means 1400 of FIG. 1.
Figure 6:
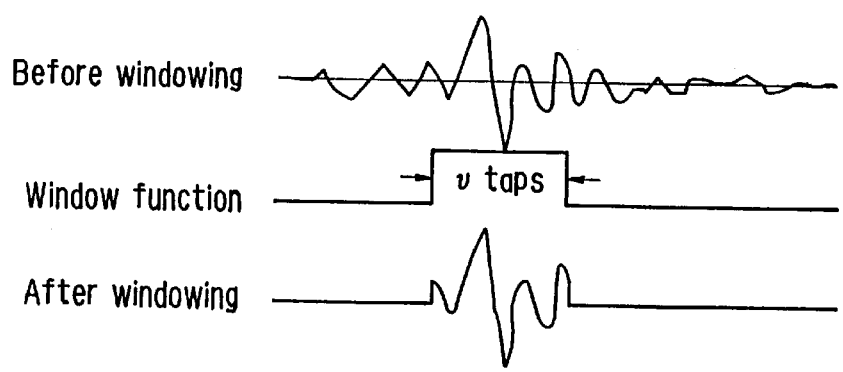
FIG. 6 is a graphic chart schematically illustrating windowing of a time-domain target impulse response $b_u(D)$.

FIG. 3 is a block diagram illustrating an internal configuration of the target-impulse-response windowing means 1400 of FIG. 1, comprising an IFFT unit 1410, a windowing section 1420 and a FFT unit 1460. The windowing section 1420, comprising a selection unit 1430, a windowing unit 1440 and a normalization unit 1450, takes charge of cutting out a time-domain signal with a time window of v taps defined by a window function as illustrated in a graphic chart of FIG. 6, wherein the time-domain discrete signal is depicted as a continuous signal.

The IFFT unit 1410 performs an inverse discrete Fourier transformation of the updated target impulse response $B_u$ outputted from the target-impulse-response update means 1300 for producing a time-domain target-impulse-response $b_u(D)$ to be processed by the windowing section 1420.

In the windowing section 1420, the selection unit 1430 selects consecutive υ taps giving a maximum total power from a tap sequence of the time-domain target-impulseresponse $b_u(D)$, other taps of the tap sequence being suppressed to zero by the windowing unit 1440. The selected consecutive υ taps are then normalized by the normalization unit 1450, so that a standard deviation of the selected consecutive υ taps becomes 1, for example. This normalization is performed for preventing the training process from converging into $b_w(D)=w_w(D)=0$.

Thus, the windowed target impulse response $b_w(D)$ in the time-domain is outputted from the windowing section 1420. The FFT unit 1460 produces the windowed target impulse response $B_w$ by transforming the windowed time-domain impulse response $b_w(D)$ into the frequency-domain.

Here, in the embodiment, the normalization unit 1450 outputs a normalization coefficient S, which is supplied to the tap-coefficient update means 2500 in parallel with the windowed target impulse response $B_w$. In the above example, the normalization coefficient S is calculated as $S=1/\sigma$, $\sigma$ being the standard deviation of the selected consecutive υ taps before the normalization.

Figure 4:
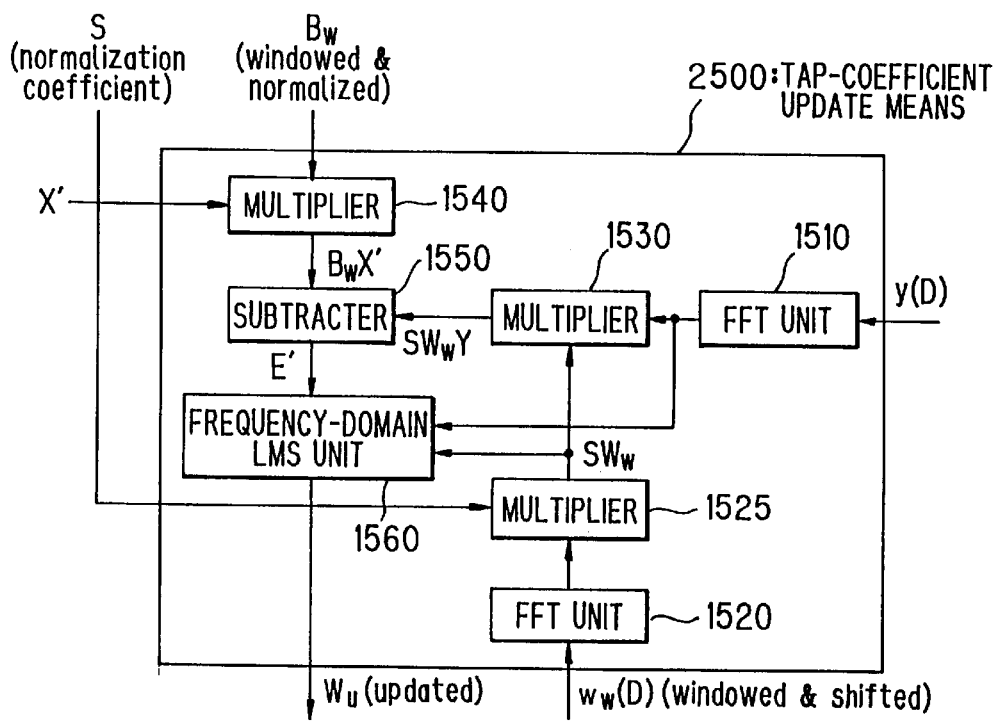
FIG. 4 is a block diagram illustrating an internal configuration of the tap-coefficient update means 2500 of FIG. 1.

FIG. 4 is a block diagram illustrating an internal configuration of the tap-coefficient update means 2500 of FIG. 1, wherein the tap coefficient $w_w(D)$ is updated making use of the frequency-domain LMS method, in the embodiment.

Referring to FIG. 4, the tap-coefficient update means 2500 comprises;

a first FFT unit 1510 for transforming the reception signal $y(D)$, which is the same with the reception signal $y(D)$ supplied to the target-impulse-response update means 1300, into a frequency-domain reception signal vector Y, a second FFT unit 1520 for transforming the tap coefficient $w_w(D)$, which is also the same with the tap coefficients $w_w(D)$ supplied to the target-impulse-response update means 1300, into a frequency-domain tap coefficient vector $W_w$, a first multiplier 1525 which multiplies the normalization coefficient S supplied from the target-impulse-response windowing means 1400 onto each component of the frequency-domain tap coefficient vector $W_w$, a second multiplier 1530 for multiplying each component of the output vector $SW_w$ of the first multiplier 1525 onto a corresponding component of the frequency-domain reception signal vector Y, a third multiplier 1540 for multiplying each component of the windowed target impulse response $B_w$ supplied from the target-impulse-response windowing means 1400 onto a corresponding component of the training vector X', which is the same with the training vector X' supplied to the target-impulse-response update means 1300, a subtractor 1550 for producing the error value E' by subtracting an output vector $SW_wY$ of the second multiplier 1550 from an output vector $B_wX'$ of the third multiplier 1540, and a frequency-domain LMS unit 1560 for calculating and outputting the updated tap-coefficient vector $W_u$ from the error value E', the output vector $SW_w$ of the first multiplier 1525, and the frequency-domain reception signal vector Y outputted from the first FFT unit 1510.

Having the above configuration, the tap-coefficient update means 2500 outputs the updated tap coefficient vector $W_u$ which is defined by following equations;

$$W_u = SW_w + 2\mu E'Y^* \quad (6)$$

$$E' = B_w X' - SW_w Y. \quad (7)$$

Therefore, the tap-coefficient update means 2500 according to the embodiment can update the windowed tap coefficient vector $W_w$ more effectively than the prior art of FIG. 13, by thus reflecting the normalization performed in the target-impulse-response windowing means 1400 along with the windowing process of the time-domain target impulse response $b_u(D)$ on the frequency-domain LMS operation for producing the updated tap coefficient vector $W_u$, enabling to shorten the convergence time and to improve robustness of the training operation against noises.

Figure 5:
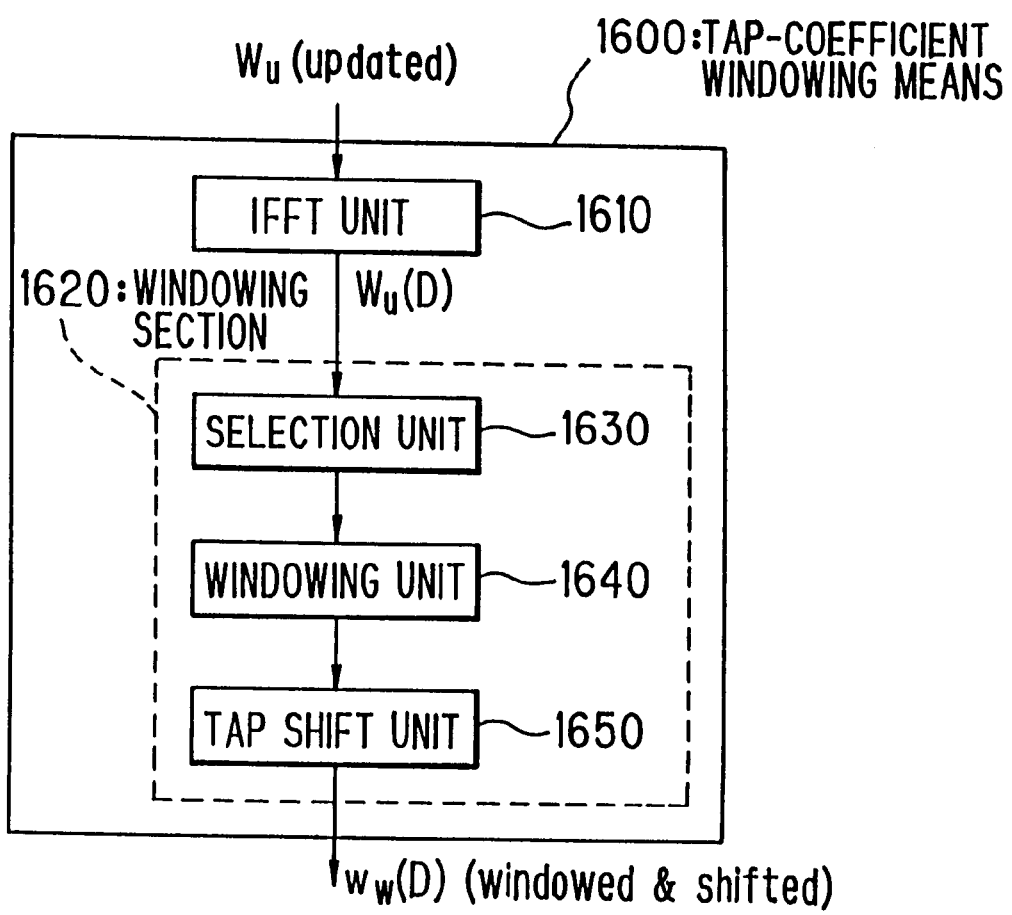
FIG. 5 is a block diagram illustrating an internal configuration of the tap-coefficient windowing means 1600 of FIG. 1.
Figure 7:
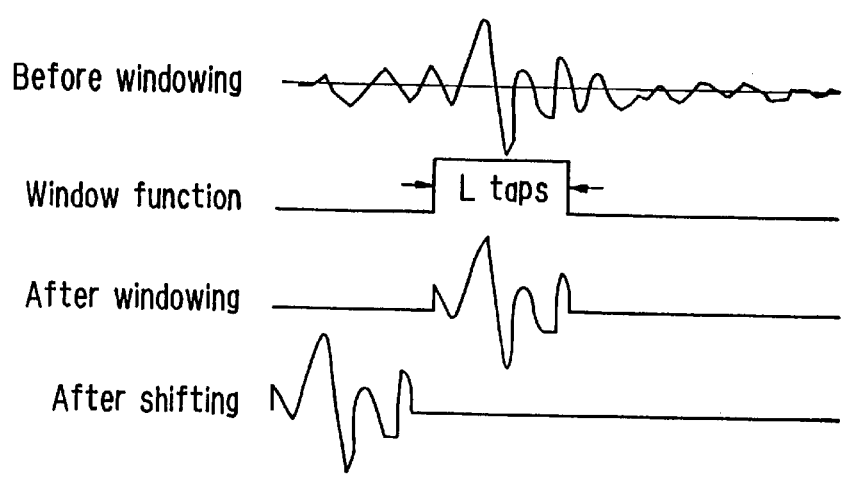
FIG. 7 is a graphic chart schematically illustrating windowing of updated tap coefficients $w_u(D)$.

FIG. 5 is a block diagram illustrating an internal configuration of the tap-coefficient windowing means 1600 of FIG. 1, comprising an IFFT unit 1610 and a windowing section 1620. The windowing section 1620, comprising a selection unit 1630, a windowing unit 1640 and a tap shift unit 1650, takes charge of cutting out L consecutive tap coefficient from a sequence of tap coefficients given as a time-domain discrete signal with a time window of L taps defined by a window function as illustrated in a graphic chart of FIG. 7, wherein also the tap coefficients consisting of discrete values are depicted as a continuous signal.

The IFFT unit 1610 performs an inverse discrete Fourier transformation of the updated tap coefficient vector $W_u$ outputted from the tap-coefficient update means 2500 for producing updated tap coefficients $w_u(D)$ to be processed by the windowing section 1620.

In the windowing section 1620, the selection unit 1630 selects consecutive L tap coefficients giving a maximum total power from a coefficient sequence of the updated tap coefficients $w_u(D)$, other tap coefficients of the coefficient sequence being suppressed to zero by the windowing unit 1640. The selected consecutive L tap coefficients are then shifted to the first L-th coefficients by the tap shift unit 1650 for producing the windowed tap coefficients $w_w(D)$ to be outputted.

The target-impulse-response update means 1300 refers to the windowed tap coefficients $w_w(D)$ for producing the updated target impulse response $B_u$ to be outputted to the target-impulse-response windowing means 1400 at the next step, and the tap-coefficient update means 2500 updates again the windowed tap coefficients $w_w(D)$ referring to the windowed target-impulsed-response $B_w$ outputted from the target-impulse-response windowing means 1400 at the next step.

Thus, the revision of the windowed target impulse response $B_w$ and the windowed tap coefficients $w_w(D)$ are performed repeatedly and alternately through the target-impulse-response update means 1300, the target-impulse-response windowing means 1400, the tap-coefficient update means 2500 and the tap-coefficient windowing means 1600, by generating the same PRBS signals repeatedly in synchronization by the first PRBS generator 110 of the transmitter 100 and the second PRBS generator 1200 of the receiver 2000, until a certain predetermined condition is reached, and through this repetition, the windowed tap coefficients $w_w(D)$ are trained into coefficient values which enable the adaptive equalizer to equalize and shorten duration of impulse response of the reception signal $y(D)$ transmitted through the transmission channel 200 within υ taps with an error sufficiently small.

The convergence condition applied in the embodiment is a condition that the total power of the consecutive L tap coefficients, selected by the selection unit 1630 of the tap-coefficient windowing means 1600, of the updated tap coefficients $w_u(D)$ becomes sufficiently large compared to a total power of the other tap coefficients thereof. However, other appropriate conditions such as a condition that the error value E' obtained from equation (7) becomes within a threshold value, or a condition that the repetition times of the above convergence process attains to a predetermined number may be used independently or in combination.

Figure 8:
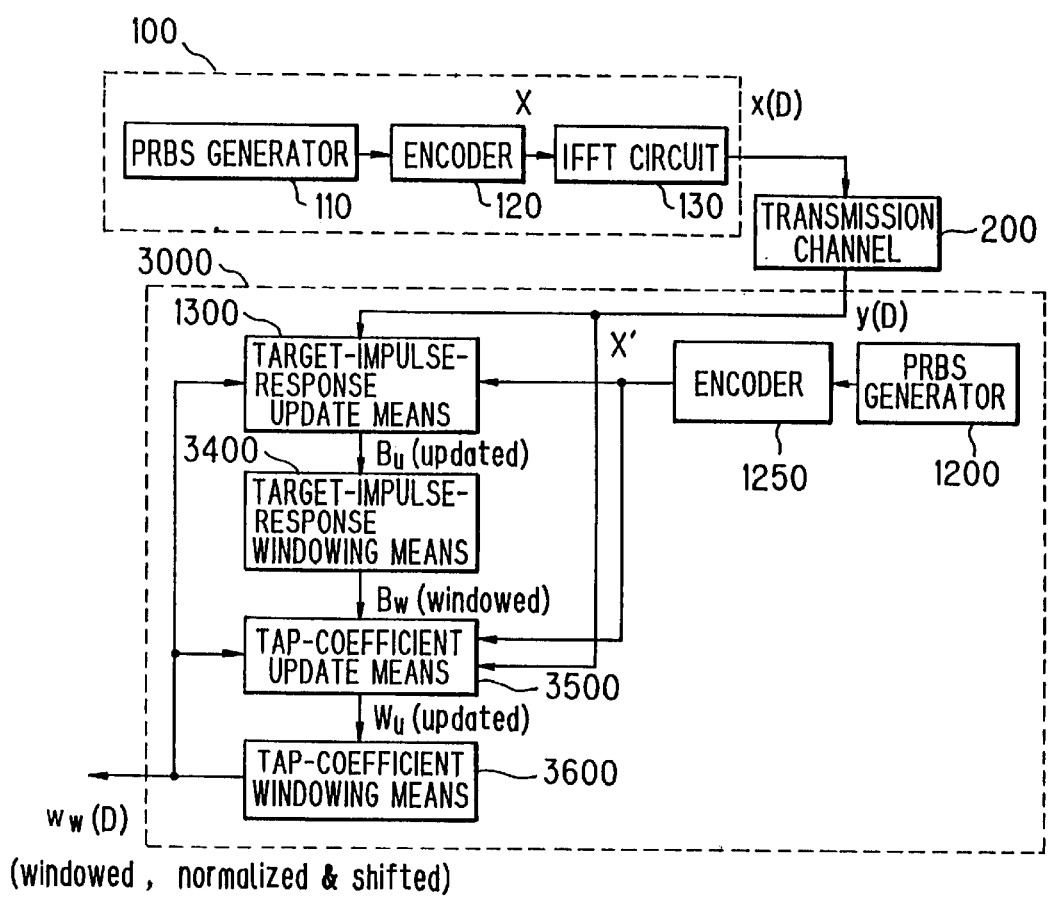
FIG. 8 is a block diagram illustrating a functional configuration of a training circuit according to another embodiment of the invention.

FIG. 8 is a block diagram illustrating a functional configuration of a training circuit according to another embodiment of the invention.

Instead of the receiver 2000 of the embodiment of FIG. 1, the training circuit of FIG. 8 has a receiver 3000, wherein the target-impulse-response windowing means 1400, the tap-coefficient update means 2500 and the tap-coefficient windowing means 1600 of FIG. 1 are replaced by a target-impulse-response windowing means 3400, a tap-coefficient update means 3500 and a tap-coefficient windowing means 3600, respectively. Other elements and their operation are the same with corresponding elements of FIG. 1, and the duplicated description is omitted.

Figure 9:
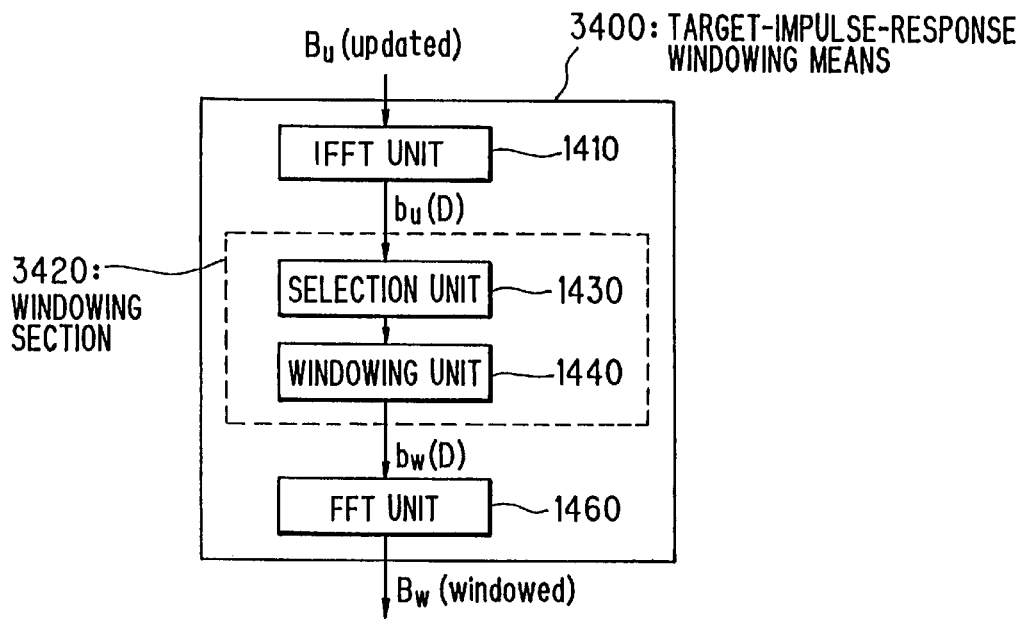
FIG. 9 is a block diagram illustrating an internal configuration of the target-impulse-response windowing means 3400 of FIG. 8.

FIG. 9 is a block diagram illustrating an internal configuration of the target-impulse-response windowing means 3400 of FIG. 8, wherein the windowing section 1420 of FIG. 3 is replaced with a windowing section 3420 not having the normalization unit 1450. As can be understood from FIG. 9, in the target-impulse-response windowing means 3400, the normalization of the consecutive υ taps selected and windowed from the time-domain target impulse response $b_u(D)$ is not performed, and consequently, the normalization coefficient S is not outputted.

Figure 10:
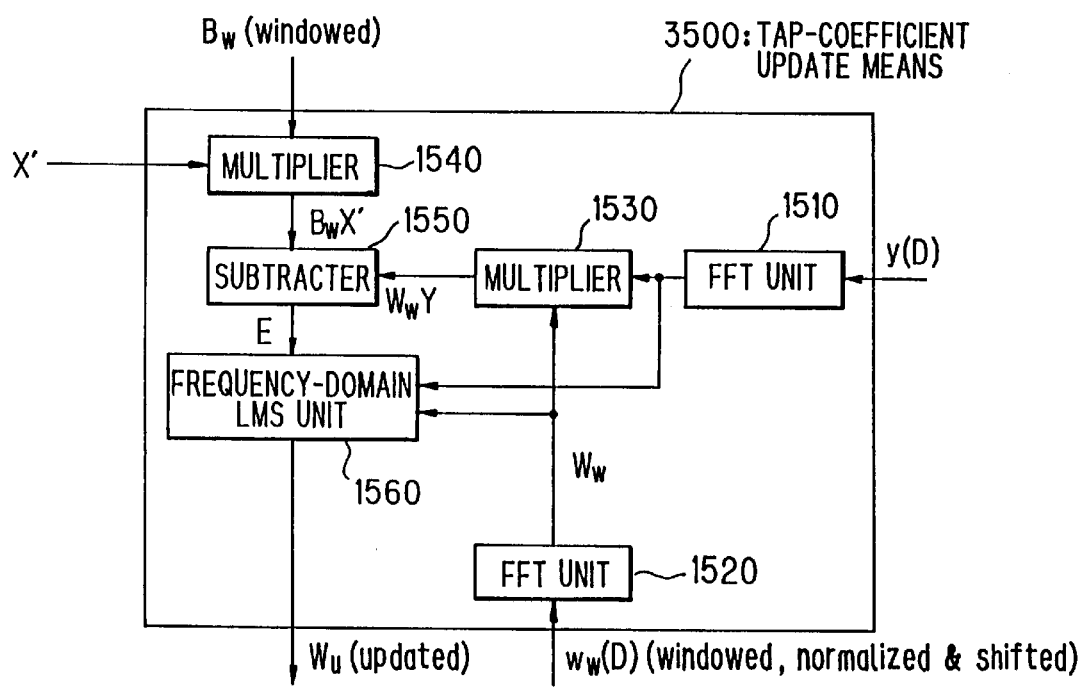
FIG. 10 is a block diagram illustrating an internal configuration of the tap-coefficient update means 3500 of FIG. 8.

Hence, the tap-coefficient update means 3500 has an internal configuration wherein the first multiplier 1525 is omitted from the tap-coefficient update means 2500 of FIG. 4, illustrated in a block diagram of FIG. 10, and the frequency-domain tap coefficient vector $W_w$ produced by the second FFT unit 1520 is supplied as it is to the second multiplier 1530 and the frequency-domain LMS unit 1560.

The frequency-domain LMS unit 1560 produces the updated frequency-domain tap coefficient $W_u$ according to following equation (4) previously described in connection with the prior art training circuit of FIG. 13;

$$W_u = W_w + 2\mu E Y^*. \tag{4}$$

Figure 11:
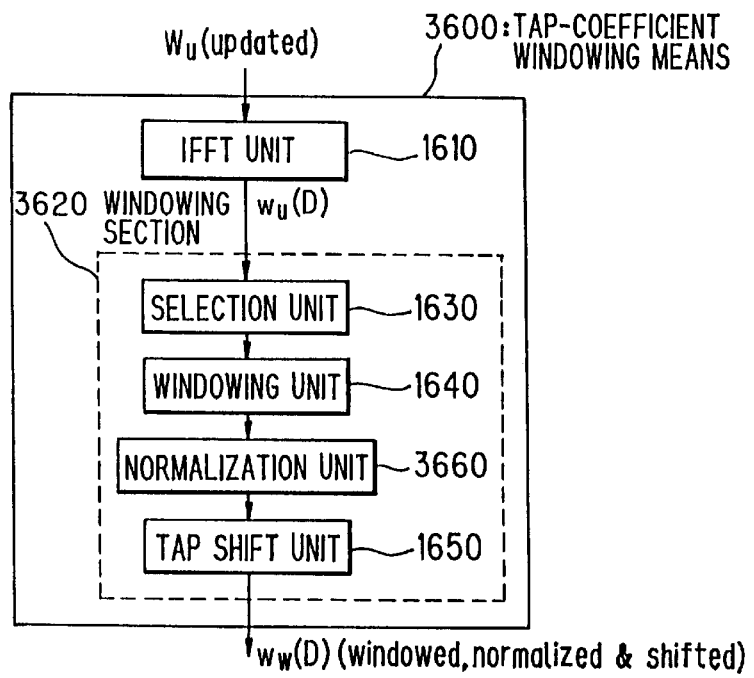
FIG. 11 is a block diagram illustrating an internal configuration of the tap-coefficient windowing means 3600 of FIG. 8.
Figure 12:
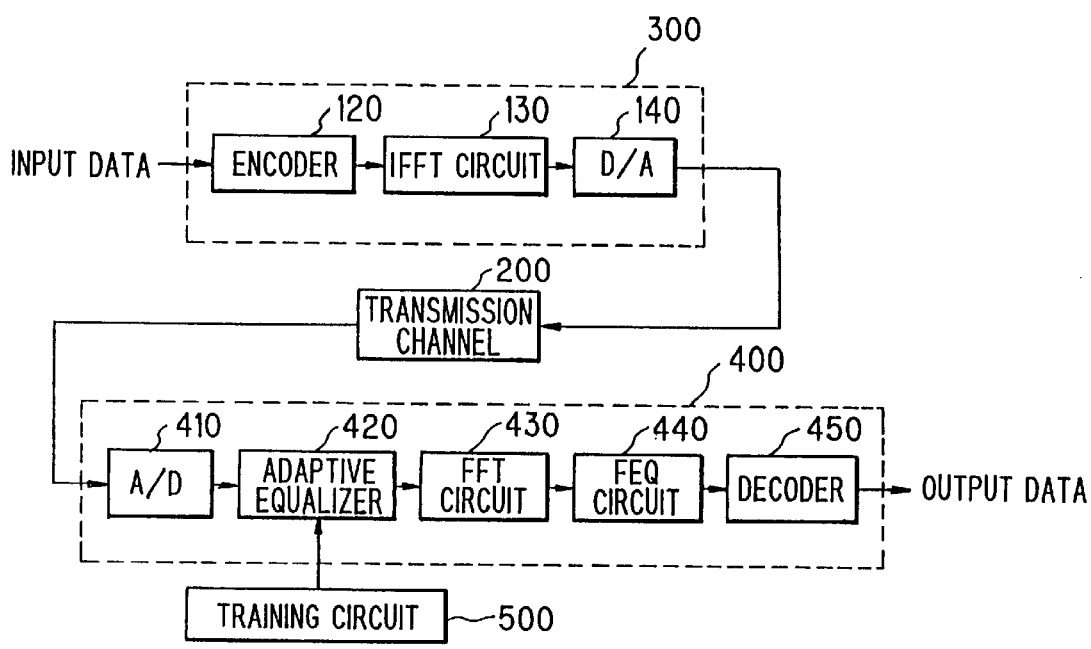
FIG. 12 is a block diagram illustrating a system configuration of a multicarrier data transmission system.

On the other hand, in a windowing section 3620 of the tap-coefficient windowing means 3600 whereof an internal configuration is illustrated in FIG. 11, a normalization unit 3600 is further comprised in addition to the configuration of the windowing section 1620 of FIG. 5.

Being provided between the windowing unit 1640 and the tap shift unit 1650, the normalization unit 3660 takes charge of normalizing consecutive L tap coefficients outputted from the windowing unit 1640 after windowed, so as to give a standard deviation of 1. The tap shift unit 1650 shifts the windowed L taps thus normalized for assigning them from the first to the L-th tap coefficient composing the windowed tap coefficients $w_w(D)$ to be outputted.

Referring to the windowed tap coefficients $w_w(D)$ thus obtained, the target-impulse-response update means 1300 of FIG. 8 produces and outputs the updated target impulse response $B_u$ at the next step to the target-impulse-response windowing means 3400, and the tap-coefficient update means 3500 updates again the windowed tap coefficient $w_w(D)$ referring to the windowed target-impulse-response $B_w$ outputted from the target-impulse-response windowing means 3400 at the next step.

In the second embodiment of FIG. 8, by thus normalizing the windowed tap coefficients $w_w$ in the tap-coefficient windowing means 3600, the training process can be as well prevented from mal-converging into $b_u(D) = w_w(D) = 0$, as in the first embodiment of FIG. 1 and the prior art of FIG. 13.

In the target-impulse-response update means 1300, the updated target impulse response $B_u$ is produced making use of the frequency-domain division method according to the equation (3), that is, in proportion to the windowed and normalized tap coefficients $w_w(D)$, and based on the updated target impulse $B_u$ thus obtained, recursive revision of the windowed tap coefficients $w_w(D)$ is continued.

Therefore, effective revision of the windowed tap coefficients $w_w(D)$ considering the normalization can be realized also in the embodiment of FIG. 8 in the same way with the embodiment of FIG. 1, enabling to shorten the convergence time and to improve robustness of the training operation against noises, without expressly retaining conformity of the normalization by way of the normalization coefficient S as required in the embodiment of FIG. 1.

Heretofore, the present invention is described in connection with embodiments wherein the windowed target impulse response $B_w$ is updated making use of the frequency-domain division method and the windowed tap coefficients $w_w(D)$ are updated making use of the frequency-domain LMS method. However, the present invention can be also applied in a case where the windowed target impulse response $B_w$ is updated making use of the frequency-domain LMS method and the windowed tap coefficients $w_w(D)$ are updated making use of the frequency-domain division method.

For example, by obtaining the normalization coefficient S from the normalization process performed in the normalization unit 3660 of FIG. 11, and updating the windowed target impulse response $B_w$ according following equations (7) and (8) with a target-impulse-response means having a similar configuration with the tap-coefficient update means 2500 of FIG. 4, the updated target impulse response $B_u$ conforming to the normalization can be obtained.

$$B_u = sB_w + 2\mu E''X^*, \tag{7}$$

$$E'' = sB_w X' - W_w Y \tag{8}$$

The updated target impulse response $B_u$ is windowed with the target-impulse-response windowing means 3400 of FIG. 9, and the updated tap coefficient vector $W_u$ is produced according to following equation (5) previously described, with a tap-coefficient update means, to be windowed again with the tap-coefficient windowing means 3600;

$$W_u = B_w Y / X'. \tag{5}$$

As heretofore described, the windowed tap coefficients $w_w(D)$ and the windowed target impulse response $B_w$ can be recursively revised and normalized maintaining conformity between them, according to the invention. Therefore, the convergence time of the training process can be remarkably reduced and the robustness against noises can be improved as well.

Further, the present invention is described in connection with training of the adaptive equalizer employed in a multicarrier data transmission system employing IFFT/FFT modulation. However, it is easily understood that the training method of the present invention can be applied effectively for training of optimizing tap coefficients of the adaptive equalizer to be employed in other systems.

What is claimed is:

1. A method of training tap coefficients of an adaptive equalizer having a first number of taps, for equalizing duration of an impulse response for a transmission channel to be shorter than a second number of taps with a sufficiently small error, having a step of initializing windowed tap coefficients to some predetermined values, a step of repeating a training procedure until a certain convergence condition of the windowed tap coefficients is attained, and a step of outputting the windowed tap coefficients as the tap coefficients of the adaptive equalizer after the certain convergence condition is attained; said training procedure comprising:

a transmission step of transmitting a transmission signal which is produced by transforming a frequency-domain transmission vector encoded with a PRBS (Pseudo-Random Binary Sequence) into a time-domain;

a target-impulse-response update step of producing an updated target impulse response by dividing an equalized reception signal vector with a training vector, the equalized reception signal vector being produced by transforming an equalized reception signal, which is obtained by processing the transmission signal received through the transmission channel with an equalizer having the first number of taps whereof coefficients are set to have values of the windowed tap coefficients, into a frequency-domain, and the training vector being produced by encoding a frequency-domain vector with a replica of the PRBS;

a target-impulse-response windowing step of outputting a windowed target impulse response together with a normalization coefficient, the windowed target impulse response being produced by transforming the updated target impulse response into a time-domain updated target impulse response signal, selecting the second number of consecutive tap values giving a maximum total power from tap values of the time-domain updated target impulse response, normalizing the selected consecutive tap values and transforming the normalized consecutive tap values into the frequency-domain, and the normalization coefficient being obtained by dividing the normalized consecutive tap values with the selected consecutive tap values before normalization;

a tap-coefficient update step of producing an updated tap coefficient vector by updating a frequency-domain tap coefficient vector multiplied by the normalization coefficient making use of a frequency-domain LMS (Least Mean Square) method with an error value defined as a difference of a product of the training vector and the windowed target impulse response to a product of the normalization coefficient, the frequency-domain tap coefficient vector and a reception signal vector, the frequency-domain tap coefficient vector being obtained by transforming the windowed tap coefficients into the frequency-domain, and the reception signal vector being obtained by transforming the transmission signal received through the transmission channel into the frequency-domain; and a tap-coefficient windowing step of producing the windowed tap coefficients by transforming the updated tap coefficient vector into updated tap coefficients, selecting the first number of consecutive coefficients giving a maximum total power from coefficients of the updated tap coefficients and shifting the selected consecutive coefficients to be assigned from a top of the windowed tap coefficients.

2. A method of training tap coefficients of an adaptive equalizer having a first number of taps, for equalizing duration of an impulse response of a transmission channel to be shorter than a second number of taps with a sufficiently small error, having a step of initializing windowed tap coefficients to some predetermined values, a step of repeating a training procedure until a certain convergence condition of the windowed tap coefficients is attained, and a step of outputting the windowed tap coefficients as the tap coefficients of the adaptive equalizer after the certain convergence condition is attained; said training procedure comprising:

a transmission step of transmitting a transmission signal which is produced by transforming a frequency-domain transmission vector encoded with a PRBS into a time-domain;

a target-impulse response update step of producing an updated target impulse response by dividing an equalized reception signal vector with a training vector, the equalized reception signal vector being produced by transforming an equalized reception signal, which is obtained by processing the transmission signal received through the transmission channel with an equalizer having the first number of taps whereof coefficients are set to have values of the windowed tap coefficients, into a frequency-domain, and the training vector being produced by encoding a frequency-domain vector with a replica of the PRBS;

a target-impulse-response windowing step of producing a windowed target impulse response by transforming the updated target impulse response into a time-domain updated target impulse response signal, selecting the second number of consecutive tap values giving a maximum total power from tap values of the time-domain updated target impulse response and transforming the selected consecutive tap values into the frequency-domain;

a tap-coefficient update step of producing an updated tap coefficient vector by updating a frequency-domain tap coefficient vector making use of a frequency-domain LMS method with an error value defined as a difference of a product of the training vector and the windowed target impulse response to a product of the frequency-domain tap coefficient vector and a reception signal vector, the frequency-domain tap coefficient vector being obtained by transforming the windowed tap coefficients into the frequency-domain, and the reception signal vector being obtained by transforming the transmission signal received through the transmission channel into the frequency-domain; and a tap-coefficient windowing step of producing the windowed tap coefficients by transforming the updated tap coefficient vector into updated tap coefficients, selecting the first number of consecutive coefficients giving a maximum total power from coefficients of the updated tap coefficients, normalizing the selected cosecutive coefficients and shifting the normalized consecutive coefficients to be assigned from a top of the windowed tap coefficients.

3. A method of training tap coefficients of an adaptive equalizer having a first number of taps, for equalizing duration of an impulse response of a transmission channel to be shorter than a second number of taps with a sufficiently small error, having a step of initializing a target impulse response and windowed tap coefficients to some predetermined values, a step of repeating a training procedure until a certain convergence condition of the windowed tap coefficients is attained, and a step of outputting the windowed tap coefficients as the tap coefficients of the adaptive equalizer after the certain convergence condition is attained; said training procedure comprising:

a transmission step of transmitting a transmission signal which is produced by transforming a frequency-domain transmission vector encoded with a PRBS into a time-domain;

a target-impulse-response update step of producing an updated target impulse response by updating the windowed target impulse response multiplied by a normalization coefficient making use of a frequency-domain LMS method with an error value defined as a difference of a product of the normalization coefficient, a training vector and the windowed target impulse response to a product of a frequency-domain tap coefficient vector and a reception signal vector, the training vector being produced by encoding a frequency-domain vector with a replica of the PRBS, the frequency-domain tap coefficient vector being obtained by transforming the windowed tap coefficients into a frequency-domain, and the reception signal vector being obtained by transforming the transmission signal received through the transmission channel into the frequency-domain;

a target-impulse-response windowing step of producing a windowed target impulse response by transforming the updated target impulse response into a time-domain updated target impulse response signal, selecting the second number of consecutive tap values giving a maximum total power from tap values of the time-domain updated target impulse response and transforming the selected consecutive tap values into the frequency-domain;

a tap-coefficient update step of producing an updated tap coefficient vector by dividing a product of the windowed target response and the reception signal vector with the training vector; and a tap-coefficient windowing step of outputting the windowed tap coefficients together with the normalization coefficient, the windowed tap coefficients being produced by transforming the updated tap coefficient vector into updated tap coefficients, selecting the first number of consecutive coefficients giving a maximum total power from coefficients of the updated tap coefficients, normalizing the selected consecutive coefficients and shifting the normalized consecutive coefficients to be assigned from a top of the windowed tap coefficients, and the normalization coefficient being obtained by dividing the normalized consecutive coefficients with the selected consecutive coefficients before normalization.

4. A training circuit for training tap coefficients of an adaptive equalize having a first number of taps to be used for equalizing duration of an impulse response of a transmission channel to be shorter than a second number of taps with a sufficiently small error; the training circuit comprising:

a transmitter for transmitting a transmission signal which is produced by transforming a frequency-domain transmission vector encoded with a PRBS into a time-domain;

a target impulse response update means for producing an updated target impulse response by dividing an equalized reception signal vector with a training vector, the equalized reception signal vector being produced by transforming an equalized reception signal, which is obtained by processing the transmission signal received through the transmission channel with an equalizer having the first number of taps whereof coefficients are set to have values of the windowed tap coefficients, into a frequency-domain, and the training vector being produced by encoding a frequency-domain vector with a replica of the PRBS;

a target-impulse response windowing means for outputting a windowed target impulse response together with a normalization coefficient, the windowed target impulse response being produced by transforming the updated target impulse response into a time-domain updated target impulse response signal, selecting the second number of consecutive tap values giving a maximum total power from tap values of the time-domain updated target impulse response, normalizing the selected consecutive tap values and transforming the normalized consecutive tap values into the frequency-domain, and the normalization coefficient being obtained by dividing the normalized consecutive tap values with the selected consecutive tap values before normalization;

a tap-coefficient update means for producing an updated tap coefficient vector by updating a frequency-domain tap coefficient vector multiplied by the normalization coefficient making use of a frequency-domain LMS method with an error value defined as a difference of a product of the training vector and the windowed target impulse response to a product of the normalization coefficient, the frequency-domain tap coefficient vector and a reception signal vector, the frequency-domain tap coefficient vector being obtained by transforming the windowed tap coefficients into the frequency-domain, and the reception signal vector being obtained by transforming the transmission signal received through the transmission channel into the frequency-domain;

a tap-coefficient windowing means for producing the windowed tap coefficients by transforming the updated tap coefficient vector into updated tap coefficients, selecting the first number of consecutive coefficients giving a maximum total power from coefficients of the updated tap coefficients and shifting the selected consecutive coefficients to be assigned from a top of the windowed tap coefficients; and a control means for initializing the windowed tap coefficients to some predetermined values, controlling the transmitter, the target-impulse-response update means, the target-impulse-response windowing means, the tap-coefficient update means and the tap-coefficient windowing means to update the windowed target impulse response and the windowed tap coefficients alternately and recursively by generating the PRBS and the replica of the PRBS repeatedly until a certain convergence condition of the windowed tap coefficients is attained, and outputting the windowed tap coefficients as the tap coefficients of the adaptive equalizer after the certain convergence condition is attained.

5. A training circuit as recited in claim 4; wherein the selected consecutive tap values are normalized by the target-impulse-response windowing means to give a standard deviation of a value of 1.

6. A training circuit as recited in claim 4; wherein a condition that a total power of the selected consecutive coefficients selected by the tap-coefficient windowing means becomes sufficiently large compared to a total power of other coefficients of the updated tap coefficients is included in the certain convergence condition of the windowed tap coefficients.

7. A training circuit as recited in claim 4; wherein a condition that a number of repetition times of updating the windowed target impulse response and the windowed tap coefficients reaches a predetermined number is included in the certain convergence condition of the windowed tap coefficients.

8. A training circuit for training tap coefficients of an adaptive equalizer having a first number of taps to be used for equalizing duration of an impulse response of a transmission channel to be shorter than a second number of taps with a sufficiently small error; the training circuit comprising:

a transmitter for transmitting a transmission signal which is produced by transforming a frequency-domain transmission vector encoded with a PRBS into a time-domain;

a target-impulse-response update means for producing an updated target impulse response by dividing an equalized reception signal vector with a training vector, the equalized reception signal vector being produced by transforming the equalized reception signal, which is obtained by processing the transmission signal received through the transmission channel with an equalizer having the first number of taps whereof coefficients are set to have values of the windowed tap coefficients, into a frequency-domain, and the training vector being produced by encoding a frequency-domain vector with a replica of the PRBS;

a target-impulse-response windowing means for producing a windowed target impulse response by transforming the updated target impulse response into a time-domain updated target impulse response signal, selecting the second number of consecutive tap values giving a maximum total power from tap values of the time-domain updated target impulse response and transforming the selected consecutive tap values into the frequency-domain;

a tap-coefficient update means for producing an updated tap coefficient vector by updating a frequency-domain tap coefficient vector by making use of a frequency-domain LMS method with an error value defined as a difference of a product of the training vector and the windowed target impulse response to a product of the frequency-domain tap coefficient vector and a reception signal vector, the frequency-domain tap coefficient vector being obtained by transforming the windowed tap coefficients into the frequency-domain, and the reception signal vector being obtained by transforming the transmission signal received through the transmission channel into the frequency-domain;

a tap-coefficient windowing means for producing the windowed tap coefficients by transforming the updated tap coefficient vector into updated tap coefficients, selecting the first number of consecutive coefficients giving a maximum total power from coefficients of the updated tap coefficients, normalizing the selected cosecutive coefficients and shifting the normalized consecutive coefficients to be assigned from a top of the windowed tap coefficients and;

a control means for initializing the windowed tap coefficients to some predetermined values, controlling the transmitter, the target-impulse-response update means, the target-impulse-response windowing means, the tap-coefficient update means and the tap-coefficient windowing means to update the windowed target impulse response and the windowed tap coefficients alternately and recursively by generating the PRBS and the replica of the PRBS repeatedly until a certain convergence condition of the windowed tap coefficient is attained, and outputting the windowed tap coefficients as the tap coefficients of the adaptive equalizer after the certain convergence condition is attained.

9. A training circuit as recited in claim 8; wherein the selected consecutive coefficients are normalized by the tap-coefficient windowing means to give a standard deviation of a value of 1.

10. A training circuit as recited in claim 8; wherein a condition that a total power of the selected consecutive coefficients selected by the tap-coefficient windowing means becomes sufficiently large compared to a total power of other coefficients of the updated tap coefficients is included in the certain convergence condition of the windowed tap coefficients.

11. A training circuit as recited in claim 8; wherein a condition that a number of repetition times of updating the windowed target impulse response and the windowed tap coefficients reaches a predetermined number is included in the certain convergence condition of the windowed tap coefficients.

12. A training circuit for training tap coefficients of an adaptive equalizer having a first number of taps to be used for equalizing duration of an impulse response of a transmission channel to be shorter than a second number of taps with a sufficiently small error; the training circuit comprising:

a transmitter for transmitting a transmission signal which is produced by transforming a frequency-domain transmission vector encoded with a PRBS into a time-domain;

a target-impulse-response update means for producing an updated target impulse response by updating the windowed target impulse response multiplied by a normalization coefficient making use of a frequency-domain LMS method with an error value defined as a difference of a product of the normalization coefficient, a training vector and the windowed target impulse response to a product of a frequency-domain tap coefficient vector and a reception signal vector, the training vector being produced by encoding a frequency-domain vector with a replica of the PRBS, the frequency-domain tap coefficient vector being obtained by transforming the windowed tap coefficients into a frequency-domain, and the reception signal vector being obtained by transforming the transmission signal received through the transmission channel into the frequency-domain;

a target-impulse-response windowing means for producing a windowed target impulse response by transforming the updated target impulse response into a time-domain updated target impulse response signal, selecting the second number of consecutive tap values giving a maximum total power from tap values of the time-domain updated target impulse response and transforming the selected consecutive tap values into the frequency-domain;

a tap-coefficient update means for producing an updated tap coefficient vector by dividing a product of the windowed target response and the reception signal vector with the training vector;

a tap-coefficient windowing means for outputting the windowed tap coefficients together with the normalization coefficient, the windowed tap coefficients being produced by transforming the updated tap coefficient vector into updated tap coefficients, selecting the first number of consecutive coefficients giving a maximum total power from coefficients of the updated tap coefficients, normalizing the selected consecutive coefficients and shifting the normalized consecutive coefficients to be assigned from a top of the windowed tap coefficients, and the normalization coefficient being obtained by dividing the normalized consecutive coefficients with the selected consecutive coefficients before normalization; and a control means for initializing the windowed target impulse response and the windowed tap coefficients to some predetermined values, controlling the transmitter, the target-impulse-response update means, the target-impulse-response windowing means, the tap-coefficient update means and the tap-coefficient windowing means to update the windowed target impulse response and the windowed tap coefficients alternately and recursively by generating the PRBS and the replica of the PRBS repeatedly until a certain convergence condition of the windowed tap coefficients is attained, and outputting the windowed tap coefficients as the tap coefficients of the adaptive equalizer after the certain convergence condition is attained.

13. A training circuit as recited in claim 12; wherein the selected consecutive coefficients are normalized by the tap-coefficient windowing means to give a standard deviation of a value of 1.

14. A training circuit as recited in claim 12; wherein a condition that a total power of selected consecutive coefficients selected by the tap-coefficient windowing means becomes sufficiently large compared to a total power of other coefficients of the updated tap coefficients is included in the certain convergence condition of the windowed tap coefficients.

15. A training circuit as recited in claim 12; wherein a condition that a number of repetition times of updating the windowed target impulse response and the windowed tap coefficients reaches a predetermined number is included in the certain convergence condition of the windowed tap coefficients.

* * * * *